US005728322A

United States Patent [19]

Kim et al.

[11] Patent Number: 5,728,322

[45] Date of Patent: Mar. 17, 1998

[54] CONDUCTIVE POLYMERIC COATINGS WITH POSITIVE TEMPERATURE COEFFICIENTS OF RESISTIVITY

[76] Inventors: Yong Chul Kim, 1105 Dong 5, Daelim Apartment, Jamwon-Dong, Seocho-Ku, Seoul City, Rep. of Korea; Hiroshi Nishino, 20-35 Yokodai 3-chome, Isogo-Ku, Yokohama City, Japan

[21] Appl. No.: 658,601

[22] Filed: Jun. 5, 1996

Related U.S. Application Data

[62] Division of Ser. No. 532,536, Sep. 22, 1995, Pat. No. 5,556,576.

[51] Int. Cl.[6] .............................. H01B 1/20; H01B 1/24; C08L 91/06

[52] U.S. Cl. .......................... 252/511; 106/271; 106/272; 524/275; 524/487

[58] Field of Search .................................... 252/510, 511, 252/512, 514; 106/1.18, 1.21, 271, 272; 524/275, 277, 487, 490

[56] References Cited

U.S. PATENT DOCUMENTS

| | | | |
|---|---|---|---|
| 4,629,869 | 12/1986 | Bronnvall | 219/553 |
| 4,877,554 | 10/1989 | Honma et al. | 252/511 |
| 4,909,960 | 3/1990 | Watanabe et al. | 252/511 |
| 5,298,721 | 3/1994 | Smuckler | 219/505 |
| 5,382,384 | 1/1995 | Baigrie et al. | 252/511 |

*Primary Examiner*—Paul Lieberman
*Assistant Examiner*—Mark Kopec

[57] ABSTRACT

A conductive polymeric coating paste made by thoroughly mixing ingredients in a heated stirring vessel is composed of an aromatic solvent, a quantity "X" of free conductor powder, a substrate-forming elastomer, which contains no diene monomer, equal to 0.25X to 0.40X, by weight, and a paraffin equal to 0.25X to 0.40X, by weight, of said conductor powder.

18 Claims, 2 Drawing Sheets

CONDUCTIVE POLYMERIC COATINGS WITH POSITIVE TEMPERATURE COEFFICIENTS OF RESISTIVITY

This application is a Division of application Ser. No. 08/532,536, filed Sep. 22, 1995 now U.S. Pat. No. 5,556, 576.

BACKGROUND OF THE INVENTION

This invention relates generally to conductive polymers and more particularly to spreadable conductive polymer coatings having positive temperature coefficients (PTC) of resistivity and to application of such coatings in useful articles.

There are currently available conductive polymers with PTC characteristics which are produced by dispersing carbon powder or the like in a melted crystalline polymer such as polyethylene and then molding the mixture to produce the desired article. Since a composition of this kind will not dissolve in solvents, it must be heated above its melting point, mixed, and extrusion molded to form desired shapes. As a result, the electrical resistivity is high, the variety of shapes is limited, and mass production is difficult if not impossible.

Application of such compositions to planar heating elements has produced unsatisfactory results due to the difficulty of fabricating the thin bodies required while maintaining uniform conductivity. Moreover, under service conditions in which the conductor is repeatedly flexed, the conductivity has decreased due to cracking of the bodies on both micro and macro scales.

Attempts to make spreadable conductive polymers by mechanically dispersing fine carbon powders in a resin to make a screen-printable paste or coating have had very limited success. They have provided unacceptably high resistivity, non-uniform resistivity, excessive variation of resistivity with temperature increases due to low bond strength between the resin and the carbon powder, and excessive weakening of the films after exposure to high temperatures. Thus, an attempt was made to prepare a conductive polymer paste by graft polymerizing a high polymer onto the surfaces of fine carbon particles to provide a network structure with improved bond strength between the carbon and the polymer. This resulted in a loss of flexibility when the resistivity was reduced to the desired level.

To the present time, all conductive polymers available have exhibited at least one or more of unsatisfactory PTC values, insufficient stability after repeated thermal cycling, inadequate mechanical strength and flexural endurance, and low fabricability.

The foregoing illustrates limitations known to exist in present conductive polymers. It would be advantageous to provide an alternative directed to overcoming one or more of those limitations, accordingly, a suitable alternative is provided including features more fully disclosed hereinafter.

SUMMARY OF THE INVENTION

In one aspect of the present invention, a conductive polymeric coating paste having a positive temperature coefficient of resistivity made by thoroughly mixing ingredients in a heated stirring vessel is composed of an aromatic solvent, a quantit, "X" of fine conduct or powder a quantity of substrate forming elastomer, which contains no diene monomer, equal to 0.25X to 0.40X, by weight and a quantity of a paraffin equal to 0.25X to 0.40X, by weight, of the conductor powder.

The foregoing and other aspects of the invention will become apparent from the following detailed description of several embodiments of the invention and from results of various tests performed on test samples made therefrom and graphically illustrated in the accompanying Figures.

DESCRIPTION OF THE PREFERRED EMBODIMENT

Figure 1:
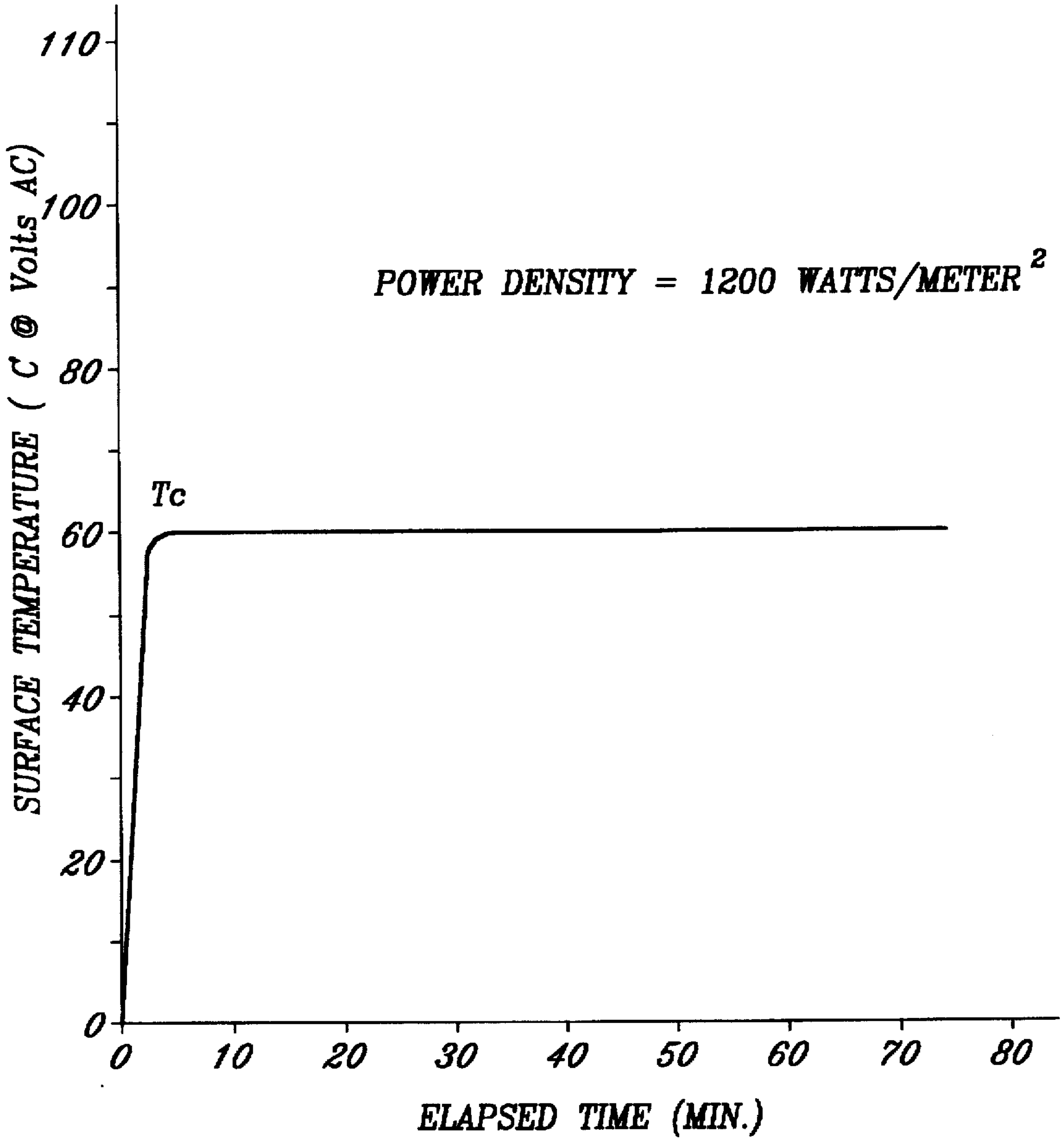
FIG. 1 shows surface temperature versus time for the surface of the test strips under a 100 volt AC potential.

The materials required for producing a conductive polymeric coating having positive PTC characteristics according to the invention include a fine conductor powder, preferably carbon, to provide conductivity; a substrate-forming material to provide mechanical strength; a unimolecular crystalline material to provide PTC characteristics; a solvent to dissolve the substrate-forming material and the PTC-providing material; and oxidation-resistant and ultraviolet stabilizers of these materials. The substrate-forming and PTC-imparting materials are particularly important in overcoming problems existing in the field.

The fine conductive powder may be any electrically conductive material including metals or even metal coated microbeads of glass, ceramics, or carbon of appropriate particle size. It is preferably graphite or carbon black or mixtures thereof typically used in an amount equal to 15% to 30%, by volume, of the solid coating materials to be dissolved in the solvent. Generally, between 6% and 10%, by volume, of conductive powder can provide conductivity. Additional amounts do little to increase conductivity and may decrease mechanical strength of the cured coating. Graphite and carbon black powders having particle sizes of 5–30 microns (μ) and 0.03–0.06 microns (μ), respectively, are the preferred conductor powders; and, when used as a mixture, are preferably mixed in the ratio of 65–85% graphite to 15–35% carbon black, by volume. Other conductor powders which are not substantially pure carbon, such as metal coated microbeads may be substituted for either or both of the preferred graphite and carbon black powders.

The graft polymerized product disclosed in U.S. Pat. No. 4,714,569, which is incorporated herein by reference, may also be used as the conductor powder. However, in that case, the selection of solvent, substrate-forming material, catalyst (if any), PTC-imparting material, and oxidation-resistant stabilizer may be affected.

The substrate-forming material (substrate-former), upon curing, provides mechanical strength to the coating and usually makes up 25% to 40%, by weight, of the solids content of the paste mixture. If too small an mount is used, the mechanical strength of the cured coating will be diminished, while too large an mount will adversely affect the properties of other constituents. One important characteristic of a substrate-former is its solubility in aromatic solvents which volatilize upon heating during cure of the coating. Such solvents include toluene, xylene, and ketones such as methyl ethyl ketone (MEK), methyl isobutyl ketone (MIBK), or mixtures thereof. In general, it is preferred to use a mixture of toluene or xylene with one of the ketones for coating paste mixtures having solids contents of approximately 50%.

It is also important that the substrate-former have sufficient intrinsic resistance to heat and oxidation after curing to retain its physical and mechanical properties when repeatedly heated and cooled in service. For this reason, preferred materials include elastomers which contain no diene monomers such as butadiene, isoprene, and others, thermoplastic resins such as modified ethylene terephthalate, and uncured thermosetting resins. In most cases, a phenol-based heat resistant stabilizer is also added during compounding of the coating paste.

Some substrate-formers may be used alone, while others may require additions of other materials to enhance strength, flexibility, hardness, or other mechanical or physical properties of the cured film. A thermoplastic elastomer which is a copolymer of ethylene, propylene, and styrene, for example, is too soft if used alone; and it may require addition of a compatible harder polymer such as polystyrene to attain the desired hardness when cured. It can be seen that a family of conductive polymeric coatings may contain several variations of substrate-former constituents in order to meet mechanical demands of widely varying applications. A coating applied to a rigid ceramic substrate in a sheltered environment will not have the same requirements for strength and durability as one applied to a fabric subjected to abrasion and flexure in service.

A thermoplastic elastomer, Kraton™G1701 made by Shell Co., is a copolymer which, when mixed with 20–30% polystyrene and dissolved in a mixture of xylene and MEK, is a substrate-former which provides the right combination of physical and mechanical attributes for cured coatings according to the invention. Properties of the coating maybe adjusted by varying the proportions of the Kraton™G1701 and polystyrene to offer a range of strength and durability applicable to a number of coating applications on a variety of base substrates, such as textiles, fiberglass, synthetic fibers, solid polymeric film, and ceramic and other rigid non-conductive bodies. If the coating is to be applied to polyethylene terephthalate (PET) film a modified PET, such as is available from Fuji Film Co., Toyobo Company, and others, should be used as the substrate-former, in order to provide good adherence of the coating to the film.

Depending on the base substrates encountered, other substrate-formers, including thermosetting resins such as epoxies, alkyd melamine, and phenolic resins can be used to obtain coating films having good heat and oxidation resistance and mechanical strength. Of course, for curing, some substrate-formers will require addition of a catalyst or initiator to the coating paste formulation.

In order to provide PTC characteristics, approximately 25–40%, by weight, of suitable PTC-imparting materials must be added to the conductive polymeric paste formulation. These include crystalline unimolecular compounds which have maximum specific volumes at their melting points. Straight paraffins have this property, but an n-paraffin shows a larger specific volume than an iso-paraffin with

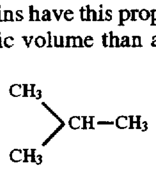

at the terminal of the molecule, and is therefore thought to produce a larger maximum resistance value in the cured coating. The PTC-imparting material must be compatible with the substrate-former, and different substrate-former systems require different PTC-imparting materials in order to realize the physical and mechanical properties for which the substrate-former was selected. When the substrate-former is an elastomer, paraffins are used. For modified PET and thermosetting resin substrate-formers it is advisable, for compatibility, to use stearic acid, stearyl alcohol, or a wax having acid, alcohol $COOH_2$ $OH_3$, or ester bonds. The mount required will depend on the substrate-former selected and the application for which the coating is intended.

Similarly, depending on the formulation of the coating, about 0.3 to about 2% of an anti-oxidant such as Irganox 1010™(Ciba-Geigy) or Anti-oxidant 330 (Ethyl Corp.) which may also be accompanied by an ultraviolet stabilizer such as Tinuvin P/300™ (Ciba-Geigy) or Eastman RMB™ (Eastman Chemical) may be added as appropriate to provide stabilization against oxidation and photo-degradation.

According to the invention, planar heating elements that can be used at temperatures up to 100° C. can be produced by a mass production system, and products with an $R_p/R_r$ value of about 10 (where $R_p$=maximum resistance and $R_r$=resistance at room temperature in units of Ω-cm) and excellent heat stability can be made. The $R_p/R_r$ value of the coating is increased with increasing PTC-imparting material content and decreased with decreasing content. A $R_p/R_r$ value of about 10 has been found high enough for practical use, while maintaining a better balance of other properties such as mechanical strength, initial electrical resistance, and stability of resistance.

Using the methods for making a conductive polymeric coating taught here, a planar heating element may be made by first making the spreadable paste and then using the paste to coat a base substrate. This is done, in one example, by placing a mixed solvent comprising MEK and xylene in a volume ratio of 1:4 in a heated stirring vessel and heating to approximately 50° C.; adding a substrate-forming elastomer (Kraton G1701) and a paraffin (Sasol-Wax (made by Sasol Co.)) and stirring to dissolve; adding a 7:3 mixture of graphite (SP-20 from Nippon Graphite) and carbon black (Denka Black from Denki Kagaku) and stirring vigorously; and feeding the resulting paste through a three roll mill for mixing and heading. The planar heater is made by diluting the paste as necessary with xylene, silk-screen printing the coating on a base substrate such as a textile of natural fiber, fiberglass, or synthetic fibers in which a copper wire is woven, drying, and baking at 130° F. to care and stabilize the PTC characteristic.

EXAMPLE #1:

A paste was made according to the invention by charging 5 kilograms (kg) of an ethylene-propylene-styrene copolymer (Kraton G1701), or styrene—ethylene/butylene— styrene copolymer (Kraton G1726) 1 kg of polystyrene pellets, and 4 kg of a straight paraffin (Sasol wax) into a stirrer equipped with a heater, and adding 15 kg of a 20:80 mixture of MIBK and xylene. The mixture was heated to 50° Celsius © and stirred vigorously to dissolve all solids, and then 3.5 kg of graphite (SP-20), or graphite intercalation compound, hereinafter GIC, (described by H. Nishino, et al, co-inventor herein, in U.S. Pat. No. 4,957,723, issued Sep. 18, 1990), and 1.5 kg of acetylene black (Denka black) were added and stirred to prepare a paste which was mix kneaded in a three roll mill to obtain a uniform product.

Using a 200 mesh stainless steel screen, PET filing were screen printed with 60 mm×60 mm coatings of the paste of 180μ thickness, dried at 120° C., and the resistivity was measured by a 4-probe method. An average value of 3.8 Ω-cm was obtained.

A narrow cotton cloth into which flue copper wires had been woven so as to give a spacing of 17 mm, was immersed in a coating solution diluted with 3 parts xylene, wrung out, dried, and baked. The $R_p/R_r$ was measured, and the stability of the resistance was tested. The $R_p/R_r$ value was 9.5. A stability test was conducted to measure the change in the hysteresis curve due to repeated heating and cooling. Test results for Example #1 are presented in FIGS. 1 and 2.

FIG. 1 graphically illustrates temperature versus time results obtained with the samples of woven cotton fabric impregnated with the coating paste, dried, and cured in the foregoing Example. The samples displayed outstanding flexibility. When insulated, on one side, with 20 plies of tissue paper and connected to an electrical power source at 50 Hertz (Hz) and 100 volts (V) at a power density of 1200 Watts (W)/square meter $(m)^2$, they generated a surface temperature ($T_c$), on the uninsulated surface, of 60° C. and maintained it substantially without deviation while the power was continued—a period of more than 80 minutes. The average temperature attained was determined by the paste formulation used. The peak surface temperature was achieved in less than 10 minutes.

Figure 2:
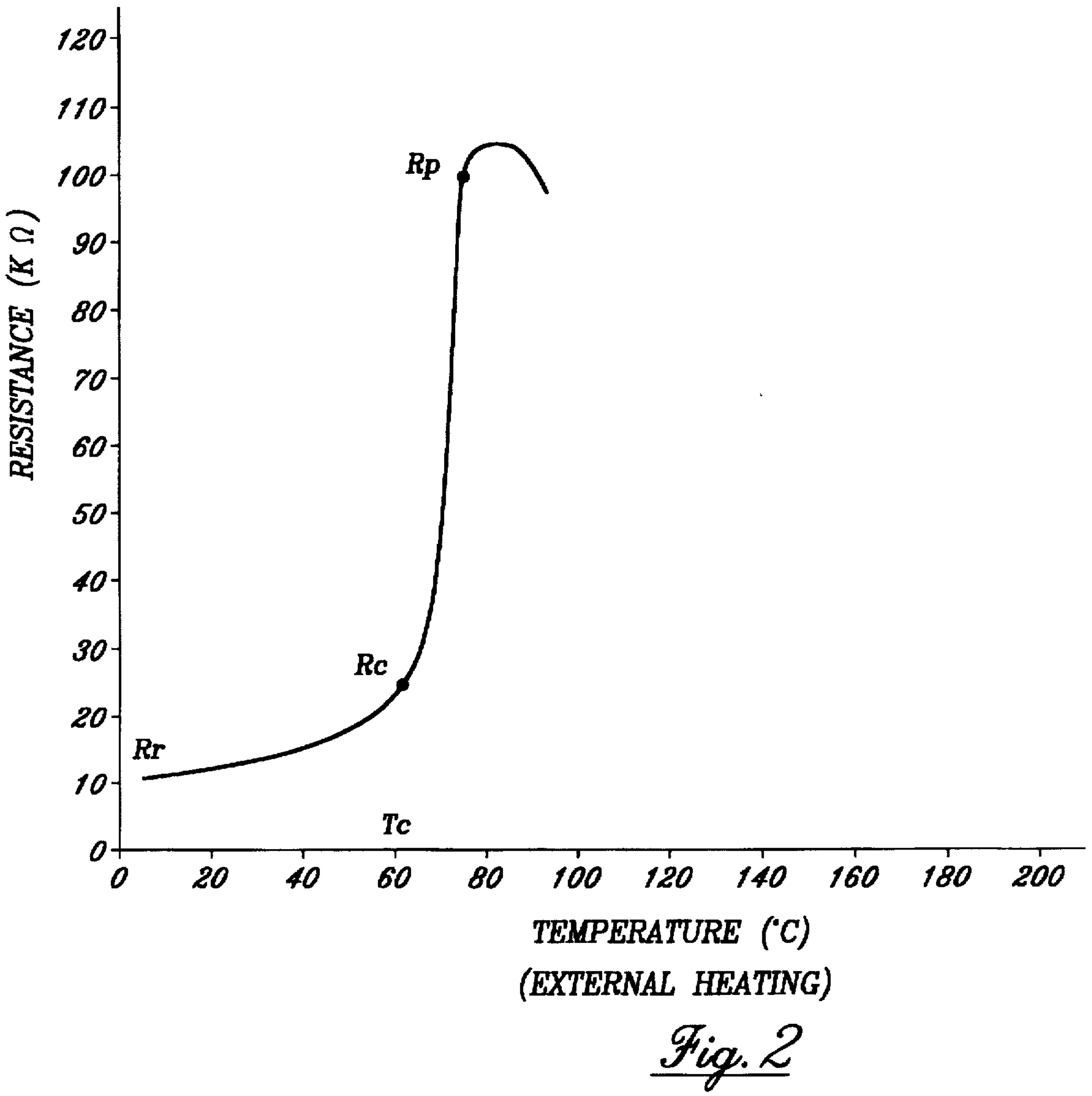
FIG. 2 shows the increase in resistance at the specified temperature $T_c$ produced by external heating.

FIG. 2 graphically illustrates the effect of temperature on electrical resistance for cured coatings when externally heated. Note that as the temperature nears $T_c$, the rate of increase in resistance becomes extremely high and peaks quickly. This sharply defined PTC characteristic is responsible for the ability of these coatings to be used in heating applications without the need for thermostatic control. By adjusting the mount of conductor powder and PTC-imparting material in the paste mixture, the $T_c$ can be adjusted to cause the heaters made from the pastes to attain different temperatures before the thermostatic behavior becomes controlling. The control temperature for a given paste varies directly as the power input, so by controlling PTC and power input, the heater performance can be virtually tailor made for a number of applications.

Example #2:

The tests of this example were carried out under the same conditions as used in Example #1, except that 5.5 kg of a modified polyethylene terephthalate (Stafix P-LC) was used in place of the elastomer and polystyrene; 4.5 kg of an alcohol-type wax (NPS-9210 from Nippon Seiro) was used in place of the straight paraffin; and 15 kg of a 50:50 mixture of MIBK and xylene was used as the solvent. Mixing, heating, and milling were performed as before. When tested on printed and cured films as before, the resistance values averaged 5.2 Ω-cm. The $R_p/R_r$ value averaged 10.6.

Example #3:

Again, the conditions of Example #1 were duplicated, except that 3.5 kg of alkyd resin (Beckosol 45-163) and 1.5 kg of melamine (Super Beckamine L-109-065)—both being the solids portions of Dainippon™ Inks—were used in place of the elastomer and polystyrene of Example #1; 5kg of stearic acid was used in place of the straight paraffin; and 15 kg of xylene was used as the solvent. The average coating film resistivity was 6.4 Ω-cm, and the average value of $R_p/R_r$ was 11.6.

From these examples, it is clear that spreadable conductive polymeric pastes can be prepared with a wide range of resistivities and PTC characteristics and yield coatings having a wide range of strength, hardness or durability, and chemical and temperature endurance. These pastes may be deposited by screen printing, painting by brush or spatula or spray, dipping, and flow coating. These deposition techniques are well known and are possible when the viscosity of the paste is properly adjusted. The resistivity values are adjusted by controlling the proportions of the conductor powder, the substrate former, and the PTC- imparting material. Drying and curing cycles are determined by the solvents and substrate-formers chosen.

We claim:

1. An electrically conductive polymeric coating paste, made by thoroughly mixing ingredients in a heated stirrer vessel, comprising:

an aromatic solvent;

a quantity "X" of free conductor powder;

a substrate-forming elastomer, which contains no diene monomer, equal to 0.25X to 0.40X, by weight; and a paraffin equal to 0.25X–0.40X, by weight, of said conductor powder.

2. The electrically conductive polymeric coating paste of claim 1, further comprising:

a hindered phenol-based heat resistant stabilizer.

3. The electrically conductive polymeric coating paste of claim 1, wherein the aromatic solvent comprises a mixture of ketone in a 1:4 ratio, by volume, with xylene or toluene and the substrate-forming elastomer comprises a thermoplastic elastomer which is a copolymer of ethylene, propylene, and styrene.

4. The electrically conductive polymeric coating paste of claim 2, wherein the aromatic solvent comprises a mixture of ketone in a 1:4 ratio, by volume, with xylene or toluene and the substrate-forming elastomer comprises a thermoplastic elastomer which is a copolymer of ethylene, propylene, and styrene.

5. The electrically conductive polymeric coating paste of claim 1, wherein the substrate-forming elastomer further comprises 20%–30%, by volume, of polystyrene.

6. The electrically conductive polymeric coating paste of claim 2, wherein the substrate-forming elastomer further comprises 20%–30%, by volume, of polystyrene.

7. The electrically conductive polymeric coating paste of claim 1, wherein the conductor powder comprises graphite with a particle size of 5–30μ and carbon black with a particle size of 0.030–0.060μ and a ratio of graphite to carbon black in the range 7:3 to 8:2, by volume.

8. The electrically conductive polymeric coating paste of claim 2, wherein the conductor powder comprises graphite with a particle size of 5–30μ and carbon black with a particle size of 0.030–0.060μ and a ratio of graphite to carbon black in the range of 7:3 to 8:2, by volume.

9. The electrically conductive polymeric coating paste of claim 3, wherein the ketone is selected from a group consisting of methyl ethyl ketone, methyl isobutyl ketone, diisobutyl ketone, diacetonealcol, octanone, and acetone.

10. The electrically conductive polymeric coating paste of claim 4, wherein the ketone is selected from a group consisting of methyl ethyl ketone, methyl isobutyl ketone, diisobutyl ketone, diacetonealcol, octanone, and acetone.

11. The electrically conductive polymeric coating paste of claim 1, wherein the aromatic solvent comprises methyl isobutyl ketone and xylene in a ratio of 1:1, by volume, and the substrate-forming elastomer comprises a modified polyethylene terephthalate.

12. The electrically conductive polymeric coating paste of claim 2, wherein the aromatic solvent comprises methyl isobutyl ketone and xylene in a ratio of 1:1, by volume, and the substrate-forming elastomer comprises a modified polyethylene terephthalate.

13. The electrically conductive polymeric coating paste of claim 1, wherein the paraffin comprises an alcohol bearing wax.

14. The electrically conductive polymeric coating paste of claim 2, wherein the paraffin comprises an alcohol bearing wax.

15. The electrically conductive polymeric coating paste of claim 1, wherein the aromatic solvent is straight xylene and the substrate-forming polymer comprises an alkyd resin and a melamine resin in a 7:3 ratio, by weight.

16. The electrically conductive polymeric coating paste of claim 2, wherein the aromatic solvent is straight xylene and the substrate-forming polymer comprises an alkyd resin and a melamine resin in a 7:3 ratio, by weight.

17. An electrically conductive polymeric coating paste made by thoroughly mixing ingredients in a heated stirring vessel, comprising:

an aromatic solvent;

a quantity "X" of fine conductor powder;

a substrate forming elastomer, which contains no diene monomer, equal to 0.25X to 0.40X by weight; and a quantity of stearic acid equal to 0.25 to 0.40X, by weight, of said conductor powder.

18. The electrically conductive polymeric coating paste of claim 17, wherein the aromatic solvent comprises a mixture of ketone in 1:4 ratio, by volume, with xylene or toluene and the substrate forming elastomer comprises a thermoplastic elastomer which is a copolymer of ethylene, polypropylene, and styrene.

* * * * *